United States Patent
Mackenbach et al.

(10) Patent No.: US 12,309,294 B2
(45) Date of Patent: May 20, 2025

(54) CLUSTERED VIRTUAL TRUSTED PLATFORM MODULE DOMAIN SERVICES SYSTEM

(71) Applicant: Dell Products L.P., Round Rock, TX (US)

(72) Inventors: Jeroen Mackenbach, Roosendaal (NL); Anantha K Boyapalle, Cedar Park, TX (US); John Henry Terpstra, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 477 days.

(21) Appl. No.: 17/728,579

(22) Filed: Apr. 25, 2022

(65) Prior Publication Data

US 2023/0344646 A1    Oct. 26, 2023

(51) Int. Cl.
*H04L 9/32* (2006.01)
*H04L 9/08* (2006.01)

(52) U.S. Cl.
CPC .......... *H04L 9/3263* (2013.01); *H04L 9/0877* (2013.01); *H04L 9/0897* (2013.01); *H04L 9/3234* (2013.01)

(58) Field of Classification Search
CPC ... H04L 9/3263; H04L 9/0877; H04L 9/0897; H04L 9/3234; H04L 2209/127; H04L 9/32; H04L 9/08
See application file for complete search history.

(56) References Cited

U.S. PATENT DOCUMENTS

| | | | |
|---|---|---|---|
| 8,359,386 B2 * | 1/2013 | Mohrmann | H04L 63/10 709/224 |
| 9,846,640 B2 | 12/2017 | Boyapalle et al. | |
| 11,201,785 B1 | 12/2021 | Kanevsky et al. | |
| 2005/0138423 A1 * | 6/2005 | Ranganathan | G06F 21/6218 718/1 |
| 2005/0246552 A1 * | 11/2005 | Bade | G06F 21/57 713/193 |
| 2007/0079120 A1 * | 4/2007 | Bade | G06F 21/57 713/166 |
| 2008/0244569 A1 * | 10/2008 | Challener | G06F 9/45558 718/1 |
| 2009/0165117 A1 * | 6/2009 | Brutch | G06F 21/57 726/14 |
| 2009/0210456 A1 | 8/2009 | Subramaniam | |
| 2017/0075699 A1 | 3/2017 | Narayanan et al. | |
| 2018/0167219 A1 * | 6/2018 | Campagna | H04L 9/3234 |

(Continued)

FOREIGN PATENT DOCUMENTS

CN    110325995 A  * 10/2019  ............. G06F 21/57

*Primary Examiner* — Jayesh M Jhaveri
(74) *Attorney, Agent, or Firm* — Larson Newman, LLP

(57) ABSTRACT

An information handling system includes a virtual trusted platform module (TPM) consumer associated with a virtual machine. The virtual TPM (vTPM) consumer may consume TPM services from a clustered vTPM domain service and determine the connection information of the vTPM domain service. The vTPM consumer transmits a connection request for a TPM operation request to the vTPM domain service, wherein the connection request includes a payload in addition to the connection information. The consumer may also receive a response associated with the TPM operation request from the vTPM domain service.

20 Claims, 6 Drawing Sheets

(56) References Cited

U.S. PATENT DOCUMENTS

| | | |
|---|---|---|
| 2018/0234326 A1 | 8/2018 | Swierk et al. |
| 2022/0035909 A1 | 2/2022 | Boyapalle et al. |
| 2022/0129591 A1* | 4/2022 | K .......................... G06F 21/74 |
| 2022/0337481 A1* | 10/2022 | Guim Bernat ...... G06F 11/3006 |

* cited by examiner

CLUSTERED VIRTUAL TRUSTED PLATFORM MODULE DOMAIN SERVICES SYSTEM

FIELD OF THE DISCLOSURE

The present disclosure generally relates to information handling systems, and more particularly relates to a clustered virtual trusted platform module domain services system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A virtual trusted platform module consumer may determine connection information of a virtual trusted platform module domain service, and transmit a connection request for a trusted platform module operation request to the virtual trusted platform module domain service, wherein the connection request includes the connection information. The consumer may also receive a response associated with the trusted platform module operation request from the virtual trusted platform module domain service.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
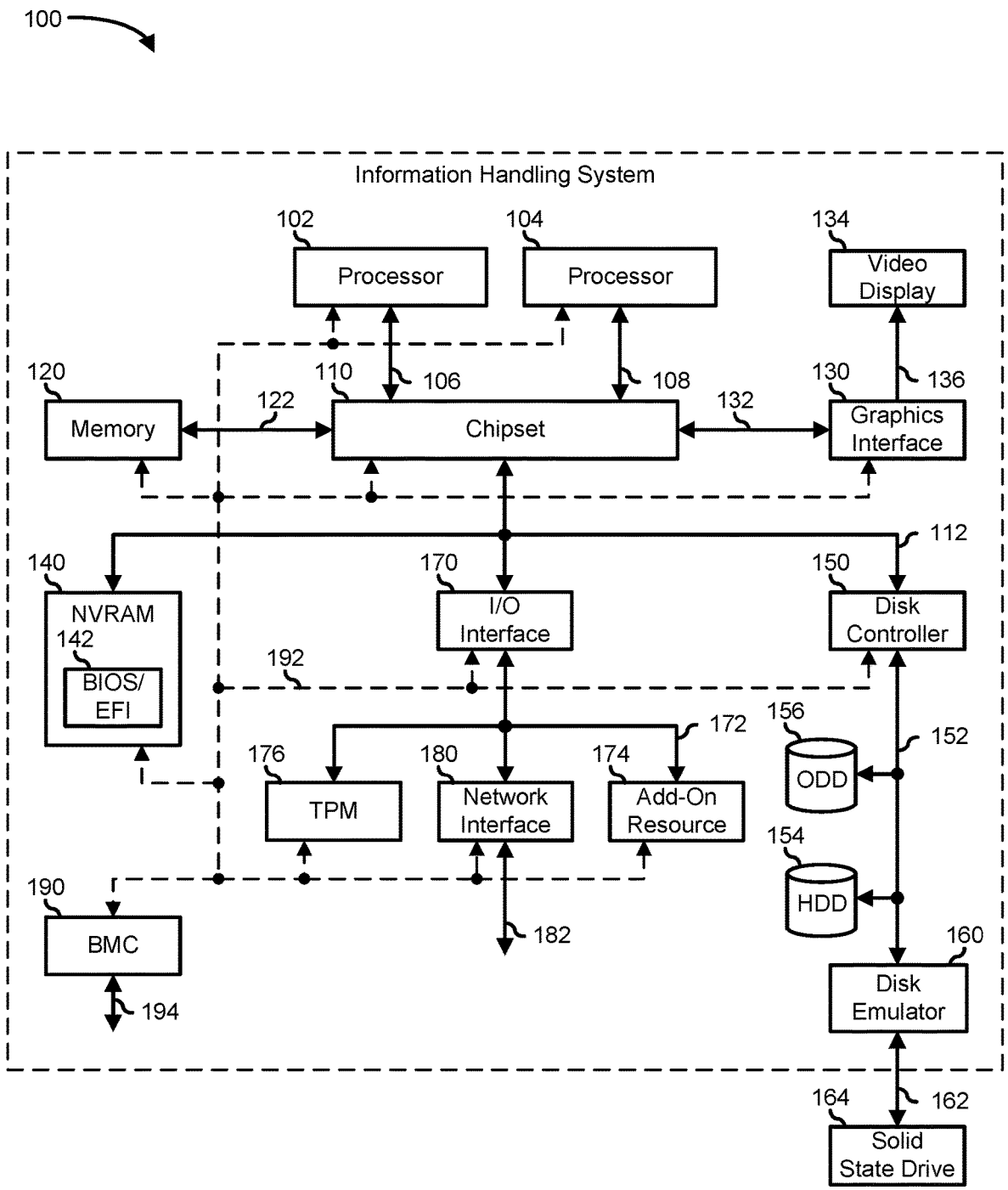
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, and non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, provide drivers for the resources, initialize the resources, and provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to a disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, and a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to the NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill in the art will appreciate that the techniques disclosed herein are applicable to other system architectures. Information handling system 100 can include multiple central processing units (CPUs) and redundant bus controllers. One or more components can be integrated. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information handling systems that are located at the edge of computing systems could be used to interfere with or compromise the safety of the entire computing system. For example, a user can plug a malicious device into one of its ports. Thus, it is desirable to implement a secure infrastructure that meets zero trust technology in these information handling systems. One way to provide this ability is to incorporate a TPM, such as TPM 176, within the information handling system and use it to perform trusted computing operations. The TPM is a microcontroller or chip developed by the Trusted Computing Group (TCG) that may store and manage secured data such as cryptographic keys. For example, the TPM may store data indicating the configuration of the information handling system. In some cases, configuration data may be used by the TPM to prevent different information handling systems or devices from accessing keys stored by the TPM. Loss of cryptographic keys on a TPM may result in an inability to access data, operations, applications, or the like on an information handling system.

A virtual machine with TPM support may be migrated to another server or hypervisor. However, migration of the virtual machine poses a problem because the platform configuration is typically tied to a specific instance of the TPM that is either physically or logically bound to the virtual machine. In addition, the TPM can be bound to a physical TPM (pTPM) or virtual TPM (vTPM) that in present technologies resides in the server that provides the hypervisor for the virtual machine. Thus, a virtual machine that is bound to a TPM, either physical or virtual, cannot be migrated to another server without loss of the TPM integrity. To address these and other issues, the present disclosure provides a system and method for a network-accessible clustered vTPM domain services such that a secured TPMdependent virtual machine can be migrated to another server or hypervisor without losing its TPM integrity.

Figure 2:
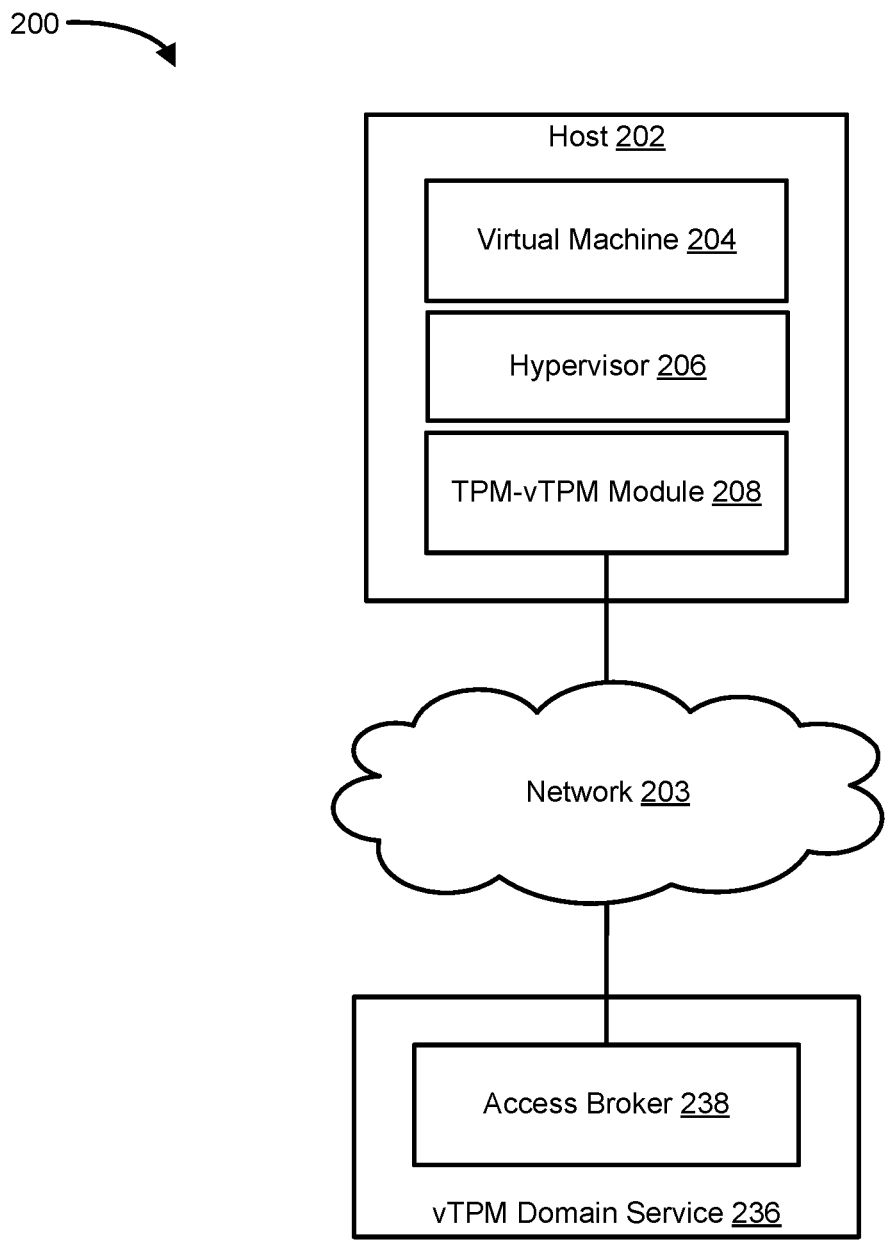
FIG. 2 is a block diagram illustrating an example system of a clustered virtual trusted platform module (vTPM) domain service, according to an embodiment of the present disclosure.

FIG. 2 illustrates a system 200, which can also be referred to as environment 200, for clustered vTPM domain services. System 200 includes a host 202, a network 203, and a vTPM domain service 236. Host 202, which is similar to information handling system 100 of FIG. 1, includes a virtual machine 204, a hypervisor 206, and a TPM-vTPM module 208. As used herein, TPM may be interchangeable with pTPM. The vTPM domain service 236 includes an access broker 238. Each of these components can be implemented with hardware and/or software. The components shown are not drawn to scale and system 200 may include additional or fewer components. For example, there may be additional hosts and vTPM domain services. In addition, connections between components may be omitted for descriptive clarity.

Host 202 may be a physical device or information handling system that is configured to host virtual machine 204 via hypervisor 206. Virtual machine 204 may be associated with TPM-vTPM module 208, also referred to as a TPM-vTPM consumer, which allows TPM to vTPM interaction. For example, TPM-vTPM module 208 may be configured to connect to and consume TPM functionality, such as key generation, secure authorization, and device-health attestation that are provided by vTPM domain service 236 via access broker 238. In other words, TPM-vTPM module 208 may be configured to consume published and supported APIs of vTPM module 208 associated with TPM commands/operations. Such APIs are in comporting with published APIs by the TCG. In addition, such APIs are similar to APIs that virtual machine 204 may use when interacting with a pTPM at host 202 via a pass-through module or a vTPM such as via an emulator module.

Hypervisor 206 may include software and/or firmware generally operable to allow multiple virtual machines and/or operating systems to run on a single computing system such as host 202 at the same time. This operability is generally allowed via virtualization, a technique for hiding the physical characteristics of computing system resources, such as the physical hardware of the computing system from how other system applications or end-users interact with those resources. Hypervisor 206 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICRO-KERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

Network 203 may be used by each component of system 200 for communicating with the other components, such as between host 202 and vTPM domain services 236. Network 203 may be implemented as or maybe as a part of, a storage area network (SAN), a personal area network (PAN), a local area network (LAN), a metropolitan area network (MAN), a wide area network (WAN), a wireless LAN (WLAN), a virtual private network (VPN), an intranet, the Internet, or any other appropriate architecture or system that facilitates the communication of signals, data and/or messages. The network may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

A zero trust host operating system in a virtual machine such as virtual machine 204 typically uses a pTM. The pTPM is typically acted with an operating system level privilege, to which only the host operating system has access. The pTPM or pseudo-physical TPM is provided by a TPM-vTPM interface, which is part of the hypervisor, that provides a logical network connection to an emulated TPM instance, also referred to herein as a vTPM instance. This vTPM instance is securely stored in a database of the clustered vTPM domain service. The trustworthiness of the vTPM instance that is stored in the vTPM domain service database is attested by maintaining a clustered quorum of a root of trust (RoT) supported by at least three physical servers or devices, each of which has a pTPM present.

The TPM-vTPM module, such as TPM-vTPM module 208, which is a vTPM may consume the TPM APIs or services provided by vTPM domain service 236, as if it is consuming services provided by a pTPM. Accordingly, the host operating system in the virtual machine as a consumer of TPM commands or operations would not notice a difference between consuming TPM APIs or services published by vTPM domain service 236, a pTPM, or a vTPM.

Figure 3:
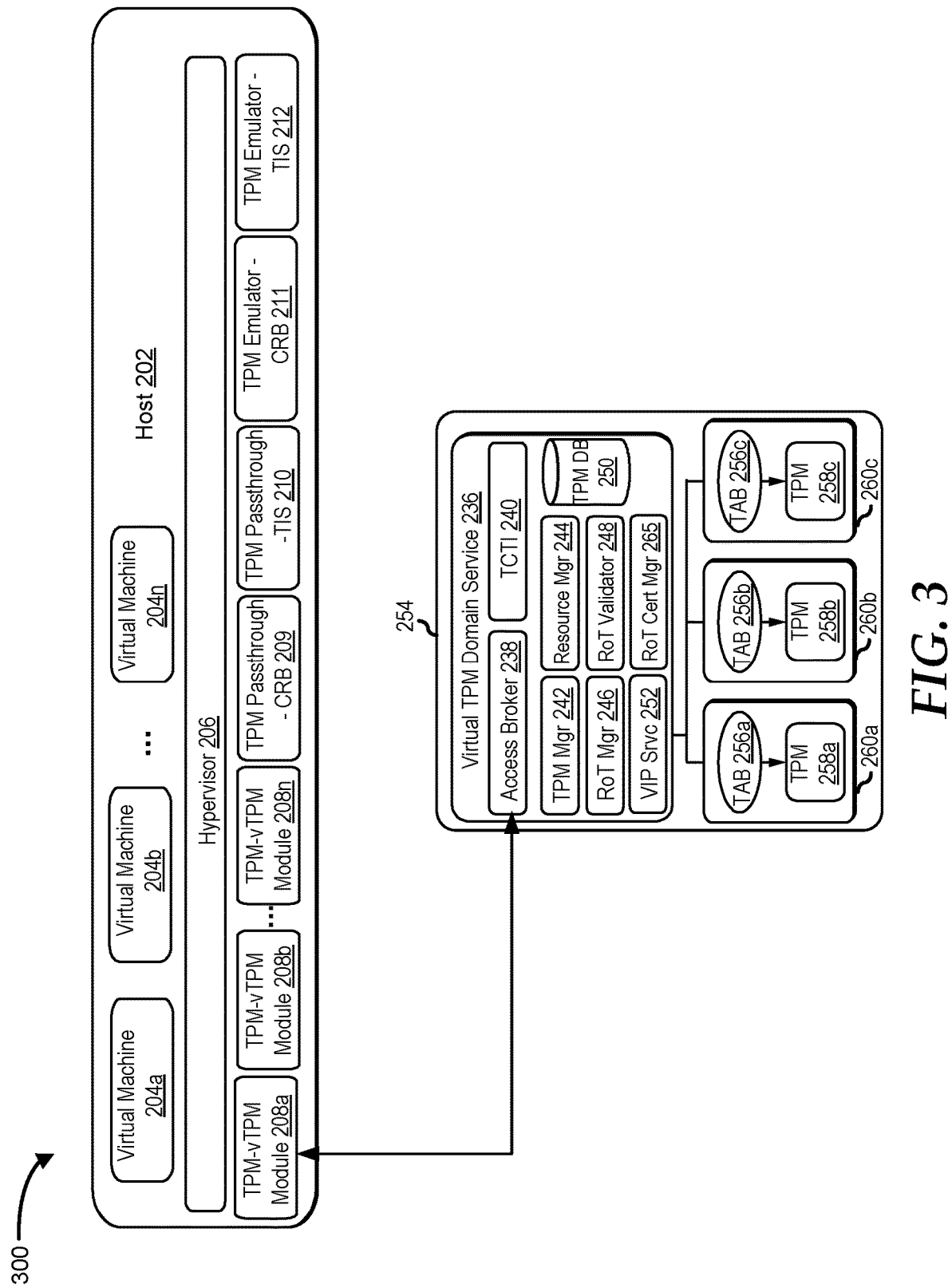
FIG. 3 is a block diagram illustrating an example system of a clustered vTPM domain service, according to an embodiment of the present disclosure.

FIG. 3 shows system 300 for clustered vTPM domain services. System 300 is a representation of system 200 in more detail. System 300 includes host 202 and vTPM domain service 236 hosted in a clustered TPM security domain 254. Host 202 includes virtual machines 204a-204n, a hypervisor 206, TPM-vTPM modules 208a-208n, a TPM pass-through—command response buffer (CRB) 209, a TPM pass-through—TPM interface specification (TIS) 210, a TPM emulator—CRB 211, and a TPM emulator—TIS 212. TPM security domain 254 includes node endpoints referred to herein as TPM nodes. For example, TPM security domain 254 includes TPM nodes 260a-260c, which may or may not be geographically co-located. Each of the TPM nodes 260a-260c includes a TPM, which is a TPM chip, and a TPM access broker (TAB). For example, TPM node 260a includes a TAB 256a and a TPM 258a. TPM node 260b includes a TAB 256b and TPM 258b. TPM node 260c includes a TAB 256c and TPM 258c. Each of these components can be implemented with hardware and/or software. The components shown are not drawn to scale and system 200 may include additional or fewer components. For example, there may be an additional host and vTPM domain services. In addition, connections between components may be omitted for descriptive clarity.

Host 202 may be configured to host virtual machines 204a-204n by employing or instantiating hypervisor 206. For example, host 202 may be a kernel-based virtual machine (KVM) node with a machine emulator such as QEMU. Virtual machines 204a-204n, which are also referred to herein as TPM clients, are emulations of computer systems that are based on computer architectures, and that provide the functionality of physical computer systems. The virtual machines may be deployed on the server when they are needed, migrated from one server to another server, or removed from the server which can result in a dynamic server environment in which virtual machines are deployed and removed regularly while utilizing different resources in that server.

Hypervisor 206 may be configured to support interaction with a physical TPM or a vTPM via an interface in either pass-through mode or an emulation mode. The pass-through mode requires exclusive access to the physical TPM. The pass-through drivers such as TPM pass-through—CRB 209 and TPM pass-through—TIS 210 are used for sending TPM commands and receiving responses to and from the physical TPM of host 202. This means the physical TPM is bound to that particular virtual machine and cannot be used by other virtual machines or host 202. During this mode, virtual machine migration is disabled. The emulation mode uses a vTPM for sending TPM commands and receiving responses. During this mode, a non-migratable file, which can be altered and its contents changed, that is handled locally by a local TAB is created. The vTPM may be accessed using TPM emulator—CRB 211 and TPM Emulator—TIS 212. TIS provides support for TIS version 1.x. CRB provides support for TIS version 2.x. As such, in both instances, the virtual machine cannot be migrated.

To migrate a virtual machine from one hypervisor to another hypervisor, there is a need for a vTPM service to provide a secure way of storing TPM emulated files in a secure storage device and attest that the storage device has not been tampered with. Accordingly, to address this and other issues, these functions may be provided by vTPM domain service 236 as disclosed herein. For example, vTPM domain service 236 may store vTPM instance files associated with virtual machines in TPM database (DB) 250. Also, vTPM domain service 236 can attest to whether TPM DB 250 and its contents have not been tampered with by leveraging a clustered RoT anchored in TPMs 258a-258c. Also, because the vTPM domain service is hosted by clustered TPM nodes, if one of the TPM nodes fails, the vTPM domain service can keep running. In addition, because vTPM domain service 236 is running on top of a network service, the virtual machine can be migrated from one hypervisor to another hypervisor or from one host to another host in the network.

The TPM-vTPM modules, such as TPM-vTPM module 208a may be configured to connect and interact with vTPM domain service 236 to consume its services. For example, TPM-vTPM module 208a may connect and send TPM commands to and receive responses from vTPM domain service 236 which is not local to host 202 and anchored to a clustered (RoT) that allows vTPM domain service 236 to offer zero-trust computing. TPM-vTPM module 208a may use various methods to determine the connection information of vTPM domain service 236. For example, TPM-vTPM module 208a may maintain a TPM-vTPM mapping or configuration file which includes one or more attributes that may be used to connect with vTPM domain service 236, such as via an internet protocol (IP) address and/or port, fully qualified domain name (FQDN), vTPM port, etc. TPM-vTPM module 208a may also utilize auto-discovery in determining the connection information, such as a domain name system (DNS) resolver/discovery method, multicast DNS (mDNS), DNS SRV/TXT lookup, etc.

The vTPM domain service 236 may be hosted by one or more TPM nodes, such as TPM nodes 260a-260c, in TPM security domain 254. TPM security domains 254 which is a networked broadcast domain may have a minimum of two TPM nodes. In addition, TPM security domain 254 may include one or more orchestrating servers from which all TPM nodes are managed and controlled, wherein each TPM node is associated with a unique identifier. While vTPM domain service 236 may run single-instanced on a single TPM node, multiple TPM nodes may be configured to host vTPM domain service 236 providing high availability. The vTPM domain service 236 may be clustered and run on two or more TPM nodes within TPM security domain 254 which allows the use of a virtual IP (VIP) for load distribution.

TPM nodes 260a-260c, also referred to herein as TPM hosts are physical endpoint devices or servers that have TPMs 258a-258c respectively, which may be used to provide a clustered RoT that is cross-certified or cross-signed by at least two TPM nodes. TPM 258a-258c are TPM chips designed to provide hardware-based, security-related functions. In particular, TPM 258a may be a secure cryptoprocessor that is designed to carry out cryptographic operations. The clustered RoT may be used by vTPM domain service 236 to perform various functions such as attest services and/or devices. For example, the clustered RoT may be used to attest that TPM DB 250 and its contents have not been tampered with. This allows vTPM domain service 236 to be offered with integrity. The attestation may be based on a quorum of at least two signing TPM nodes. In addition, a cluster of two TPM nodes may be used to sustain current vTPM connections or service new vTPM connections. For example, each of the clustered TPM nodes may sign a certificate authority (CA) certificate for vTPM domain service 236. High availability may be achieved with a quorum of three or more TPM nodes. The cluster of TPM nodes can be scaled based on current requirements, such as adding or removing TPM nodes.

The vTPM domain service 236 may be configured to perform functions such as instantiate, maintain, and/or delete one or more vTPMs. A virtual machine may have its own vTPM instance. As such, vTPM domain service 236 may have a plurality of vTPM instances each of which is bound and provides TPM functionality to a virtual machine that may be in different hypervisors, and/or hosts. The vTPM domain service 236 may be configured to audit each vTPM instance with respect to hypervisor host affinity and permit vTPM instances to be restricted to a particular hypervisor. The vTPM domain service 236 can access the operations history of each vTPM instance. In addition, the vTPM domain service 236 may as lock/unlock vTPM instances, add/remove vTPM instance usage alert triggers, and report on the history of vTPM instances and usage. The vTPM domain service 236 may also be configured to perform vTPM service maintenance such as reporting system events to a central logging authority and raising alarms or alerts for various events associated with vTPM instances.

Each vTPM instance may be associated with a virtual machine, comport with TPM APIs as published by the TCG, support TPM 1.x and 2.x protocols, and stored within TPM database 250a. The vTPM APIs published and supported by vTPM domain service 236 are similar to APIs used by zero trust host operating system in a virtual machine to interface with either a local pTPM or vTPM hosted by a bare-metal machine or the host of the virtual machine. Further, the vTPM APIs support TPM API calls supported by a pTPM. For example, each virtual machine that requests a TPM instance shall have its own vTPM. Configuration files associated with the virtual machine being bound to the vTPM may be maintained in TPM DB 250a. In addition, vTPM domain service 236 may instantiate child vTPMs for nested virtual machines. The vTPM domain service 236 may create a unique public key infrastructure (PKI) certificate and a globally unique identifier and associate them with the vTPM instance. The vTPM identifier may be used by TPM-vTPM module 208a to connect to the corresponding vTPM instance. The vTPM domain service may also provide the vTPM with each instance being anchored within its own seal of trust that is provided by a quorum of physical TPM nodes 260a-260c that participate in signing and assuring the integrity of the TPM DB 250 thus forming the RoT for the clustered vTPM domain service. As the vTPM domain service 236 may be configured to provide and manage the pTPM RoT anchor from a clustered RoT, if one of the TPM nodes fails, a quorum of the TPM nodes exists allowing the RoT to still stand.

The vTPM domain service 236 includes an access broker 238, a TPM command transmission interface (TCTI) 240, a TPM manager 242, a resource manager 244, a RoT manager 246, a RoT validator 248, a TPM database (DB) 250, a VIP service 252, and a RoT certification manager 265. Access broker 238 may be configured to handle access or connections to vTPM domain service 236 by one or more TPM-vTPM modules simultaneously. Access broker 238a may also be configured to handle various interfaces such as TIS and CRB that may be used by the TPM-vTPM modules. TPM manager 242 may be configured to manage one or more pTPMs that are clustered under vTPM domain service 236. For example, TPM manager 242 may be configured to perform several functions such as initialize a new cluster and its virtual IP address, issue and maintain vTPM instances, issue and recognize vTPM PM certificates and identifiers, add/remove a TPM node, erase a cluster and vTPM database, manage the tombstone lifetime and evacuate state connection records, and assure the viability of the vTPM RoT cluster.

RoT manager 246 also referred to as RoT cluster manager, may be configured to manage RoT certificates associated with each of TPMs 258a-258c. For example, RoT manager 246a may respond to requests for RoT certificates. In addition, RoT manager 246a may be configured to register TABs 256a-256c each of which handles multi-process synchronization to TPMs 258a, 258b, and 258c respectively. RoT manager 246a may also be configured to maintain a quorum for the RoT. When the quorum fails, RoT manager 246a may issue an alarm or alert that the integrity of vTPM domain service 236 is compromised. If the quorum is compromised, then the clustered RoT may not instantiate a new vTPM. The quorum should then be restored to a quorum status manually.

RoT validator 248 may be configured to validate or verify the authenticity of RoT certificates which may be cross-signed by each of the TPM nodes. For example, RoT validator 248 may verify that the CA certificate associated with the RoT TPM TAB is valid and has not been tampered with. If the CA certificate is about to expire within a certain threshold, then RoT manager 246a may notify the TPM node that hosts the RoT TPM TAB so that its CA certificate can be refreshed before it expires. The threshold may be a default threshold or set by an administrator. For example, the threshold may be a day or week before the expiration of the CA certificate. RoT certification manager 265a may be configured to create and store copies of the RoT CA certificates in TPM database 250a. In addition, RoT certification manager 265 may be responsible for the lifecycle management of the RoT CA certificates and for initiating and completing CA certificate refreshes. RoT certification manager 265a may also be responsible for the eviction of expired RoT CA certificates when they are no longer in use, such as when the expired RoT CA certificates have been tombstoned long enough so that the eviction will not cause operational issues.

Resource manager 244 may be configured to manage TPM nodes 260a-260c and TPMs 258a-258c. TPM database 250a may be configured to store information associated with vTPM domain service 236 and its components. For example, TPM database 250a may store concurrent sessions maintained by TPMs 258a-258c which may be used to validate whether a reloaded session context is the most recent version. In addition, TPM database 250 may store one or more files and/or configurations associated with vTPM instances. VIP service 252 may be configured to maintain and distribute a VIP address across registered TPM nodes via address resolution protocol (ARP) or other means. While TCTI 240a may be configured to handle communication to and from the lower layers of the TPM software stack (TSS) software stack.

Figure 4:
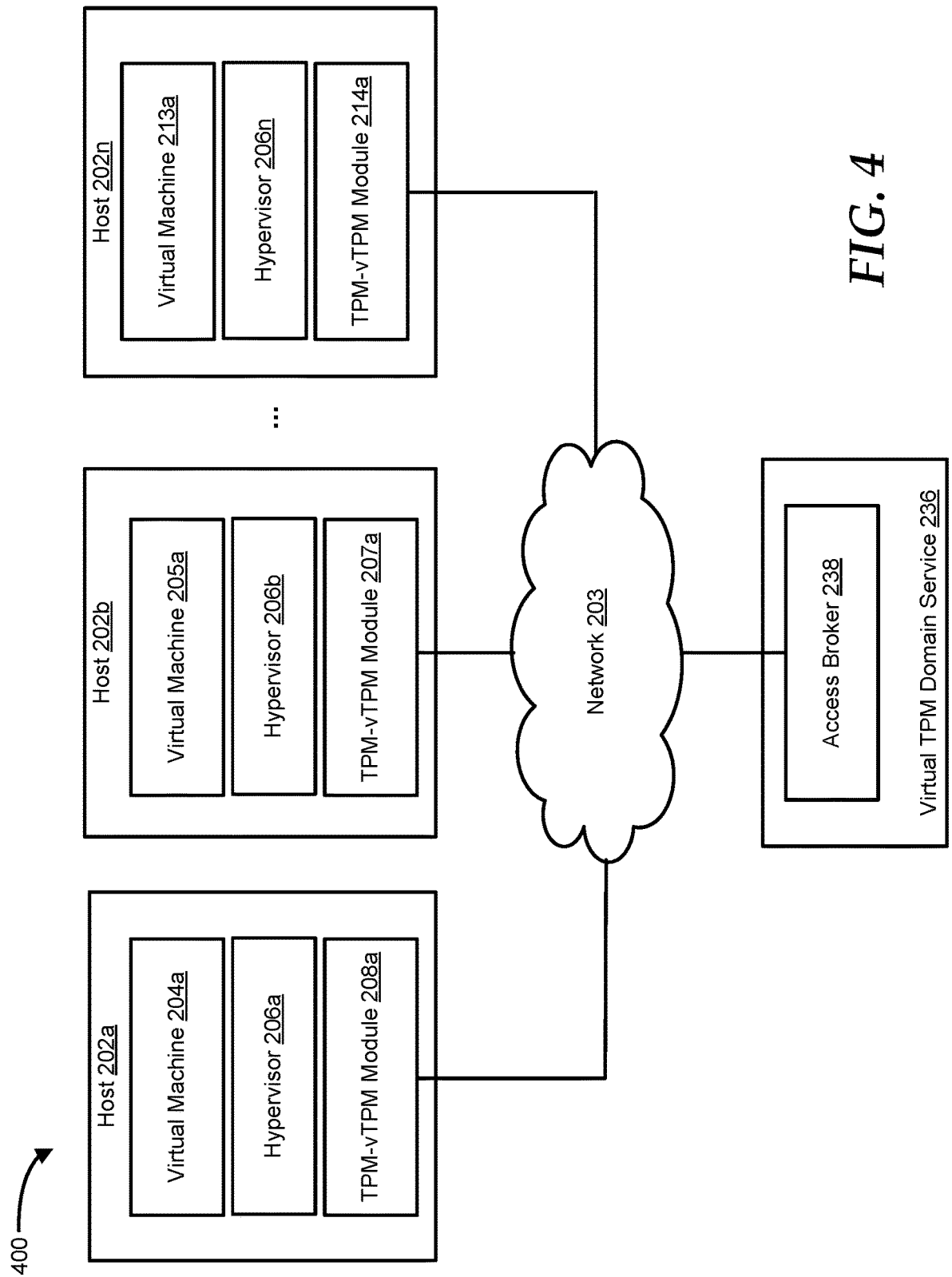
FIG. 4 is a block diagram illustrating an example system of a clustered vTPM domain service, according to an embodiment of the present disclosure.

FIG. 4 shows system 400 for clustered vTPM domain services. System 400 is similar to system 300 of FIG. 3 and system 200 of FIG. 2. System 400 includes a plurality of hosts 202a-200n, network 203, and vTPM domain service 236. Each of hosts 202a-202n, which is similar to host 202 of FIG. 2 is configured to host virtual machines. Host 202a includes a virtual machine 204a, a hypervisor 206a, and a TPM-vTPM module 208a. Host 202b includes a virtual machine 205a, a hypervisor 206b, and a TPM-vTPM module 207a. Host 202n includes a virtual machine 213a, a hypervisor 206n, and a TPM-vTPM module 214a. Each of the virtual machines 204a, 205a, and 213a is similar to virtual machine 204 of FIG. 2. Similarly, each of hypervisors 206a-206n is similar to hypervisor 206, and each of TPM-vTPM modules 208a, 207a, and 214a is similar to TPM-vTPM module 208 of FIG. 2. Similar to TPM-vTPM module 208, each of TPM-vTPM modules 208a, 207a, and 214a may directly interact with vTPM domain service 236.

Figure 5:
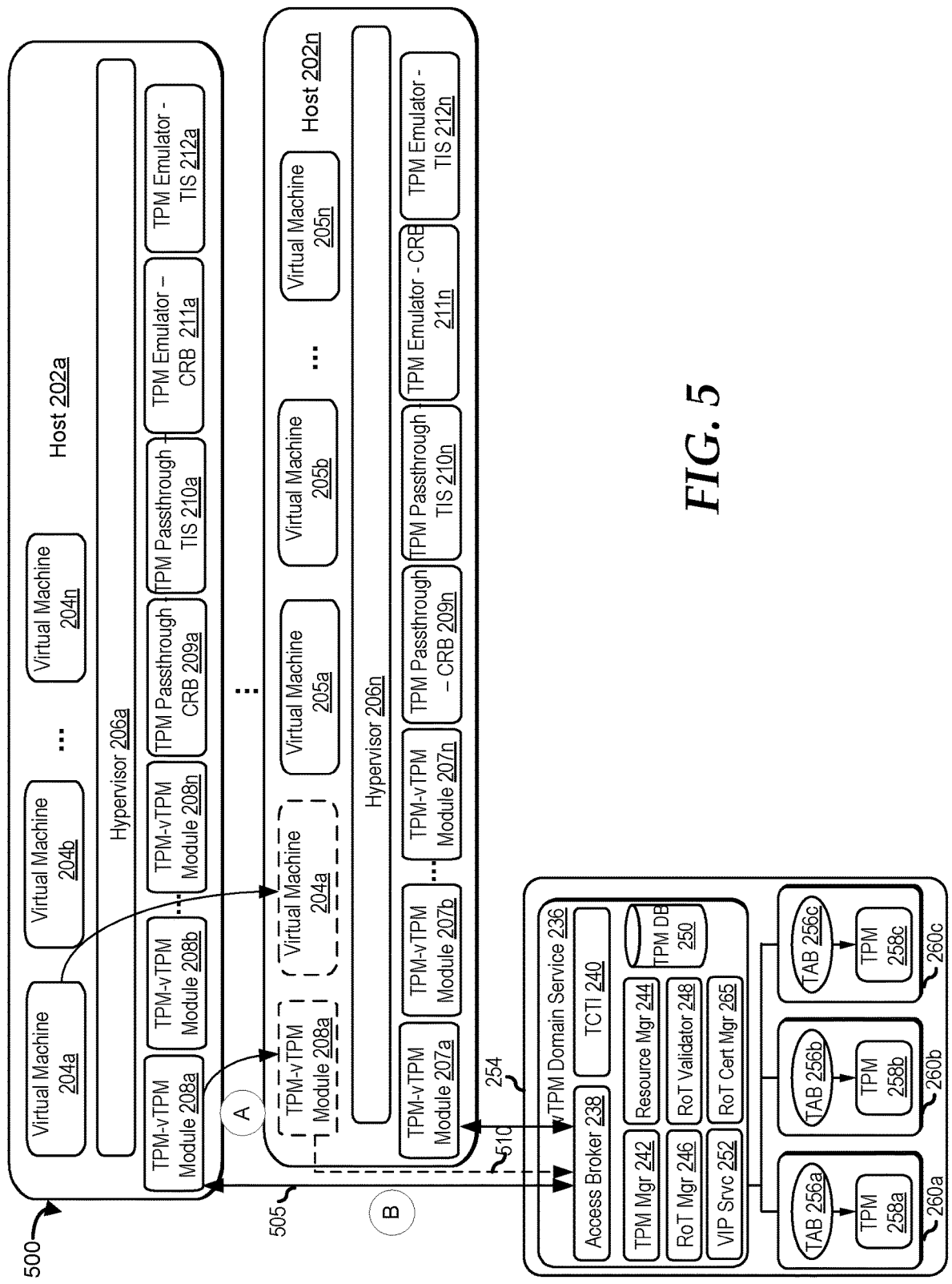
FIG. 5 is a block diagram illustrating an example system of a clustered vTPM domain service, according to an embodiment of the present disclosure.

FIG. 5 shows system 500 for clustered vTPM domain services similar to system 300 of FIG. 3. System 300 is a representation of a portion of system 400 in more detail. System 500 includes host 202a and vTPM domain service 236 in TPM security domain 254. Host 202a includes virtual machines 204a-204n, a hypervisor 206a, TPM-vTPM modules 208a-208n, and a TPM pass-through—CRB 209a, a TPM pass-through—TIS 210a, a TPM emulator—CRB 211a, and a TPM emulator—TIS 212a. Host 202na includes virtual machines 205a-205n, a hypervisor 206n, TPM-vTPM modules 207a-207n, a TPM pass-through—CRB 209n, a TPM pass-through—TIS 210n, a TPM emulator—CRB 211n, and a TPM emulator—TIS 212n. In this example, TPM-vTPM modules 208a and 207a are shown to directly interact with vTPM domain service 236 via access broker 238, which may be performed simultaneously.

FIG. 5 is annotated with letters A and B. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, virtual machine 204a is migrated from hypervisor 206a to hypervisor 206n. As part of the migration of virtual machine 204a, TPM-vTPM module 208a is also migrated. During the migration, configuration information associated with virtual machine 204a and TPM-vTPM module 208a may be copied over to hypervisor 206n. In addition, memory space associated with virtual machine 204a and TPM-vTPM module 208a is synchronized with hypervisor 206n.

At stage B, a new connection 510 to vTPM domain service 236 is created by TPM-vTPM module 208a and a previous connection 505 is closed. Because the domain security identifier and the virtual machine identifier are the same, TPM-vTPM 208a may connect to the same vTPM instance stored in TPM DB 250 of vTPM domain service 236. The domain security identifier may have been issued by vTPM domain service 236 and associated with virtual machine 204a during the instantiation of the vTPM instance which would have occurred while virtual machine 204a was residing at hypervisor 206a before migrating to hypervisor 206n. The virtual machine identifier may have been associated with virtual machine 204a when it was provisioned at hypervisor 206a. Because the pTPM RoT anchoring system for each vTPM instance is remote and the configuration file or the vTPM instance file is also maintained remotely, the virtual machine that is TPM enabled may be migrated between hypervisors and hosts.

Those of ordinary skill in the art will appreciate that the configuration, hardware, and/or software components of systems depicted above may vary. For example, the illustrative components are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In addition, the functions and features of components such as virtual machines, hypervisors, databases, and TPMs are known in the art and will not be further disclosed herein, except as needed to illustrate the various embodiments disclosed herein. In the discussion of the figures, reference may also be made to components illustrated in other figures for continuity of the description. Although discussions of component functionality may be represented by a single component, the functions of these types of components are similar. For example, the functionality of TPM-vTPM module 208a is similar to TPM-vTPM module 207a.

Figure 6:
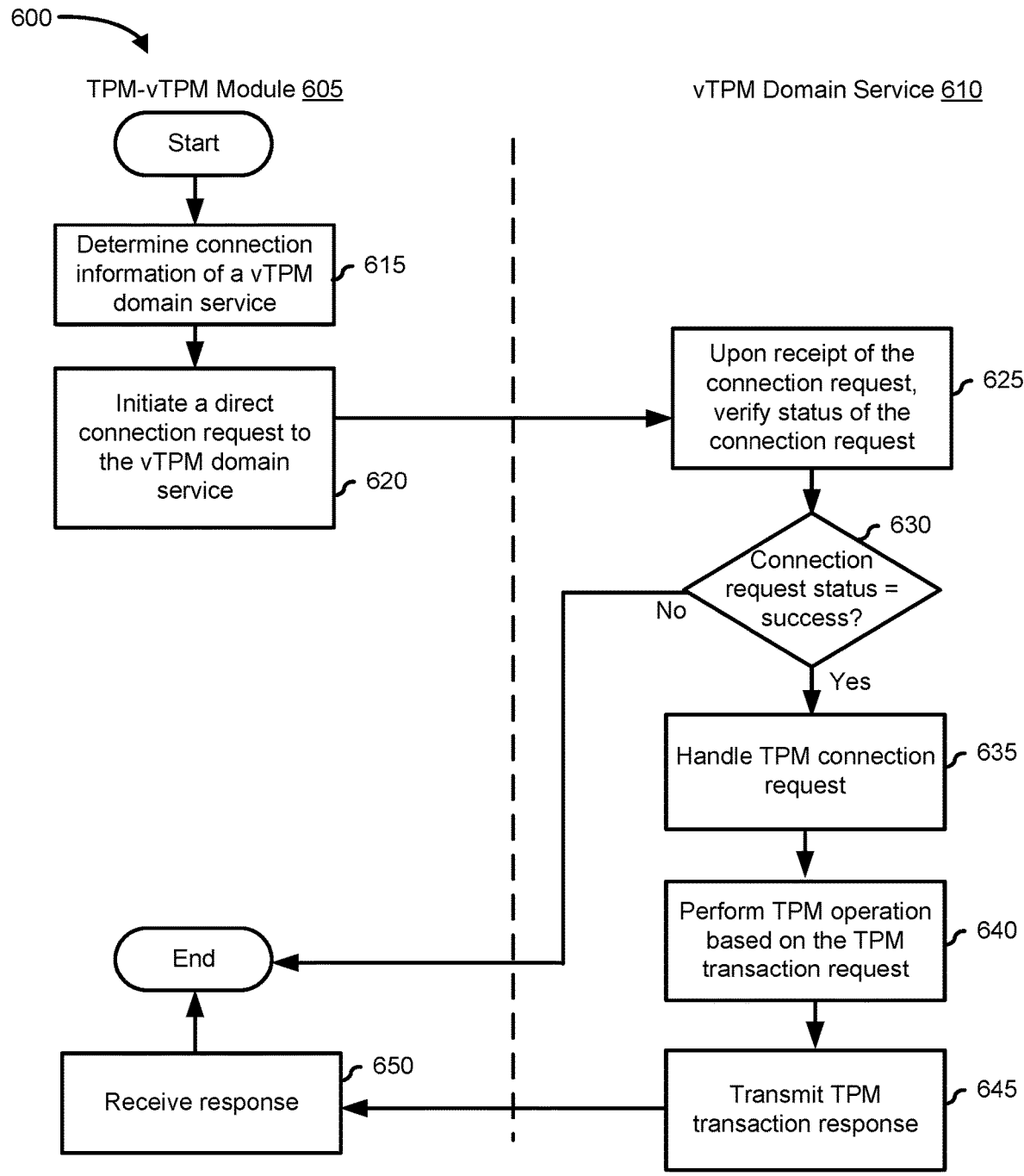
FIG. 6 is a flowchart illustrating an example of a method associated with a clustered vTPM domain service, according to an embodiment of the present disclosure.

FIG. 6 illustrates a method 600 associated with interaction of a TPM-vTPM module with a clustered vTPM domain service. In this example, method 600 may be performed by a TPM-vTPM module 605 and a vTPM domain service 610 which are similar to TPM-vTPM module 208 and vTPM domain service 236 respectively of FIG. 2. TPM-vTPM module 605 may also be similar to TPM-vTPM module 207a and vTPM domain service 236 of FIG. 3. However, while embodiments of the present disclosure are described in system 200 of FIG. 2 and system 300 of FIG. 3, it should be recognized that other systems may be utilized to perform the described method. One of skill in the art will appreciate that this flowchart explains a typical example, which can be extended to advanced applications or services in practice.

With method 600, TPM-vTPM module 605 directly communicates with vTPM domain service 610 to perform a TPM command or transaction. Method 600 typically starts at block 615 where TPM-vTPM module 605 determines connection information associated with a vTPM domain service 610. Before block 615, a virtual machine, an application, a device, a service, etc. may have issued a request for a TPM command or operation. For example, the virtual machine may request to get information about the endorsement key and certificates which is then transmitted to the hypervisor and then to the TPM-vTPM module 605, which then determines where to transmit the connection request. TPM-vTPM module 605 may also determine the vTPM instance associated with the virtual machine.

The connection information may include network connection information such as the IP address, identifier, and/or the FQDN of the vTPM domain service. The connection information may also include vTPM instance, vTPM domain service, or the TPM security domain identifier and virtual machine identifier. The connection information may also include the transmission control protocol (TCP) port and/or a PKI or an X.509 certificate associated with one of TPM-vTPM module 605, the virtual machine, hypervisor, or the host. The certificate may have been retrieved by an administrator using a resource manager of the vTPM domain service before a request for a TPM operation. The determination may be performed via configuration files or by using auto-discovery. In addition, the connection request may include a payload associated with the TPM command/operation.

At block 620, TPM-vTPM module 605 initiates a direct connection request to vTPM domain service 610 based on the connection information. The connection request may also include a request for the TPM command or operation and associated payload if any. At block 625, vTPM domain service 610 receives and verifies the status of the connection request. The status of the connection request may be based on validation performed at the network level before receipt of vTPM domain service 610. For example, the validation may determine whether the connection request is allowed to access vTPM domain service 610. The vTPM domain service 610 may also attest that the connection is from a trusted TPM-vTPM module. If the connection request is allowed, the connection status may be set to "success," otherwise the connection status is set to "fail."

The method proceeds to decision block 630 to determine whether the status of the connection request is equal to success. If the status connection request is successful, then the "YES" branch is taken and the method proceeds to block 635. If the connection request is not successful, then the "NO" branch is taken and the method ends. At block 635, vTPM domain service 610 handles the connection request and payload if any may be processed. For example, the vTPM domain service may determine the vTPM instance and/or the pTPM associated with the connection information, wherein the vTPM instance or pTPM can perform an operation associated with the transaction request.

The method proceeds to block 640 where vTPM domain service 610 performs TPM command or operation based on the connection request. For example, the TPM operation may be a query for data from a register or buffer in the pTPM or vTPM. The TPM operation may also be a write of data to the register or buffer of the TPM. The vTPM domain service may update a configuration setting that is associated with a virtual machine from a first hypervisor to a second hypervisor, wherein both hypervisors are associated with the same vTPM domain service and/or the same clustered RoT that is anchored to a pTPM. This allows the virtual machine to migrate to the second hypervisor without vTPM enablement issues. In addition, because the configuration setting may be stored in a TPM database maintained by the vTPM domain service, there is no configuration file maintained locally at the host.

The method proceeds to block 645 where vTPM domain service 610 may transmit a response to TPM-vTPM module 605. The response may include status and/or data associated with the TPM operation. For example, if the TPM operation is to query for data, then the response may include the queried data. At block 650, TPM-vTPM module 605 receives the response. TPM-vTPM module 605 may process the response such as providing the received data to the virtual machine or hypervisor which is the origin of the TPM transaction.

Although FIG. 6 shows example blocks of method 600 in some implementations, method 600 may include additional blocks, fewer blocks, different blocks, or differently arranged blocks than those depicted in FIG. 6. Those skilled in the art will understand that the principles presented herein may be implemented in any suitably arranged processing system. Additionally, or alternatively, two or more of the blocks of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   a trusted platform module (TPM); and
   a virtual TPM (vTPM) domain service that is further configured with at least two TPM servers providing a root of trust that is cross-signed by each one of the at least two TPM servers, the vTPM domain service is configured to:
   receive a connection request for a TPM operation from a TPM-vTPM, wherein the TPM-vTPM is configured to connect and consume TPM functionality of the vTPM domain service; and
   transmit a response associated with the TPM operation to the TPM-vTPM.

2. The information handling system of claim 1, wherein the TPM operation is performed by a vTPM instance linked with a virtual machine that is associated with the TPM-vTPM.

3. The information handling system of claim 1, wherein the connection request is to consume an application programming interface published by the vTPM domain service.

4. The information handling system of claim 3, wherein the application programming interface published by the vTPM domain service comports with TPM application programming interfaces published by a trusted computing group.

5. The information handling system of claim 3, wherein the application programming interface published by the vTPM configured as a domain service supports a second application programming interface of a hardware TPM.

6. The information handling system of claim 1, wherein the root of trust is provided to a virtual machine associated with the TPM-vTPM.

7. The information handling system of claim 1, wherein the TPM is further configured to sign a vTPM certificate authority certificate.

8. The information handling system of claim 1, wherein the at least two TPM servers are configured as a cluster.

9. The information handling system of claim 1, wherein the vTPM domain service is clustered.

10. The information handling system of claim 1, the vTPM domain service is further configured to generate a vTPM identifier to be used for the connection request.

11. The information handling system of claim 1, the TPM operation is to migrate a virtual machine from the vTPM domain service to a second vTPM domain service.

12. An information handling system, comprising:
    a processor configured to host a virtual machine;
    a memory including a trusted platform module (TPM)—virtual trusted platform module (vTPM) associated with the virtual machine, wherein the TPM-vTPM is configured to consume services provided by a hardware TPM via a vTPM domain service, wherein the TPM-vTPM is configured to:

determine connection information of the vTPM domain service;

transmit a connection request for a TPM operation to the vTPM domain service, wherein the connection request includes the connection information and a root certificate that is cross-signed by each one of at least two TPM servers associated with the hardware TPM and the vTPM domain service; and receive a response associated with the connection request for the TPM operation from the vTPM domain service.

13. The information handling system of claim 12, wherein the connection information includes an internet protocol address associated with the vTPM domain service.

14. The information handling system of claim 12, further comprising determining an identifier associated with the vTPM domain service.

15. The information handling system of claim 12, wherein the root certificate is a public key infrastructure certificate that was retrieved from the vTPM domain service prior to the TPM operation.

16. The information handling system of claim 12, wherein the vTPM domain service verifies that a status of the connection request is a success prior to performing the TPM operation.

17. A method comprising:

determining, by a processor, connection information of a virtual trusted platform module (vTPM) domain service;

determining an identifier of the vTPM domain service;

transmitting, by a trusted platform module (TPM)-vTPM a connection request for a TPM operation to the vTPM domain service, wherein the connection request includes the connection information and a root certificate that is cross-signed by each one of at least two TPM servers associated with a hardware TPM and the vTPM domain service; and receiving a response associated with the TPM operation from the vTPM domain service.

18. The method of claim 17, wherein the connection information is an internet protocol address of the vTPM domain service.

19. The method of claim 17, wherein the root certificate is a public key infrastructure certificate that was retrieved from the vTPM domain service prior to the TPM operation.

20. The method of claim 17, wherein the vTPM domain service verifies that a status of the connection request is a success prior to performing the TPM operation.

* * * * *